July 10, 1923.  
F. R. KLAUS ET AL  
1,461,531  
METHOD OF MAKING CUSHION TIRE STRUCTURES  
Filed Feb. 8, 1923  2 Sheets-Sheet 1
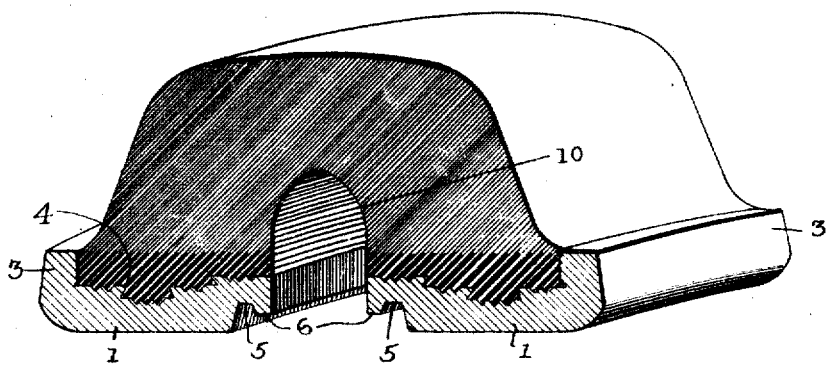
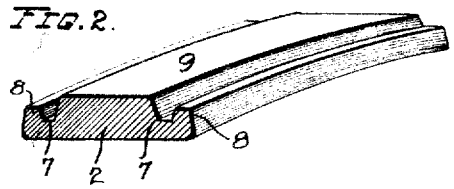
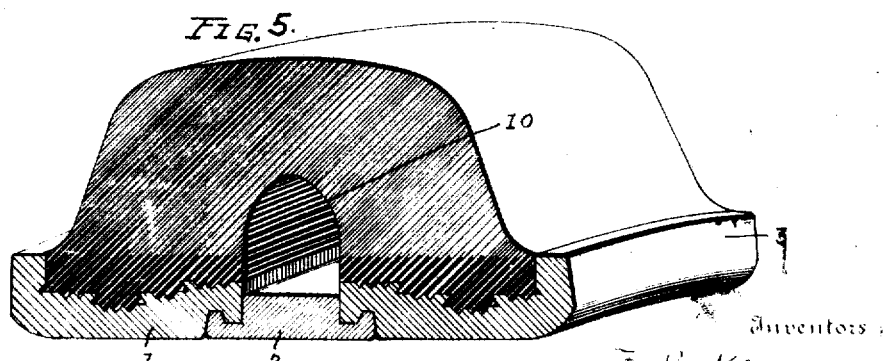

July 10, 1923.
F. R. KLAUS ET AL
1,461,531
METHOD OF MAKING CUSHION TIRE STRUCTURES
Filed Feb. 2, 1923 2 Sheets-Sheet 2
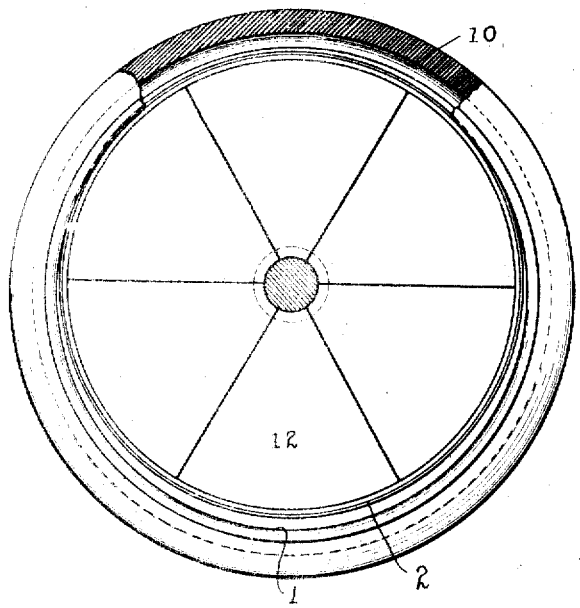
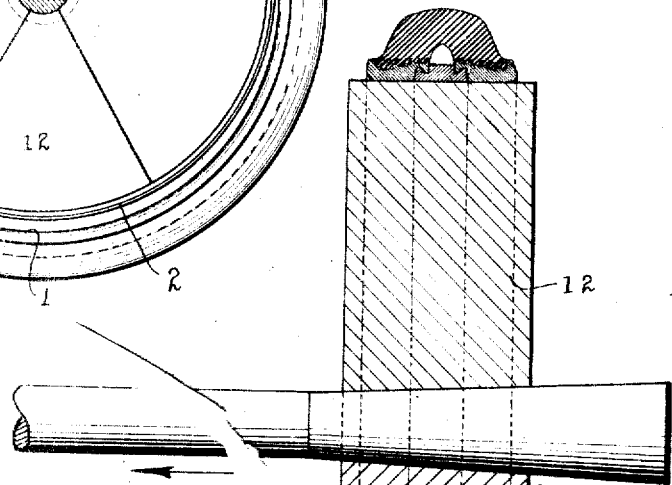
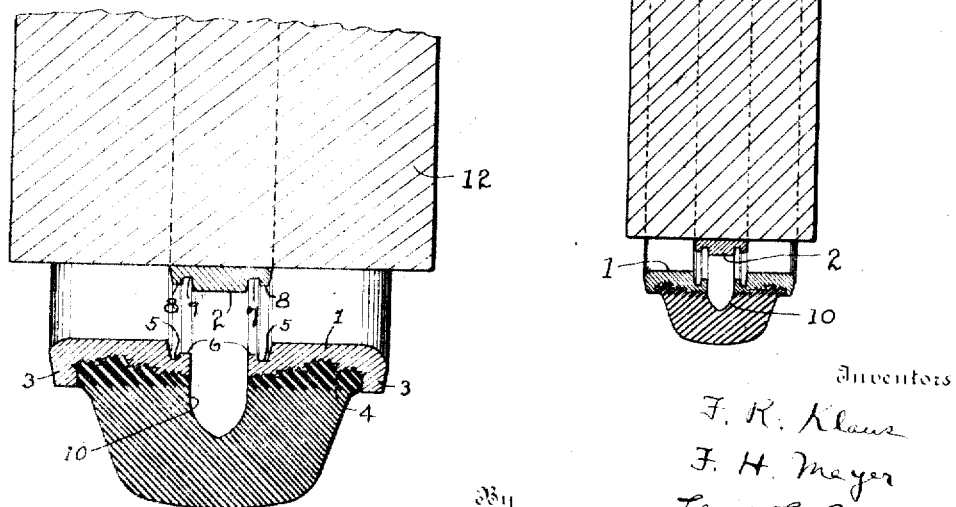
Inventors
F. R. Klaus
F. H. Meyer
Lloyd L. Evans
Attorney Patented July 10, 1923.

1,461,531

UNITED STATES PATENT OFFICE.

FRED R. KLAUS AND FRANK H. MEYER, OF WARREN, OHIO.

METHOD OF MAKING CUSHION-TIRE STRUCTURES.

Application filed February 2, 1923. Serial No. 616,510.

*To all whom it may concern:*

Be it known that we, FRED R. KLAUS and FRANK H. MEYER, citizens of the United States, residing at Warren, in the county of Trumbull and State of Ohio, have invented a certain new and useful Improvement in Methods of Making Cushion-Tire Structures, of which the following is a full, clear, and exact description, reference being had to the accompanying drawings.

This invention relates to tire structures and the method of making the same, and appertains more particularly to cushion tires of the type in which a tire with an inner recess or channel is moulded and cured directly upon a tire base.

It is an object of the present invention to provide a cushion tire structure in which the base or rim has as much strength as a continuous integral rim and which can be forced laterally upon the fixed rim of a wheel without deformation.

A further object is to provide a method of forming cushion tire structures of this type in which fewer core sections are required and in which the insertion and removal of the core sections are simplified.

A further object is to provide a cushion tire structure in which a spacing ring is expanded or stretched and interlocks with side sections having a tire structure secured thereto, to form with said side sections a rigid ring.

A further object is to provide a method of forming a tire base in which the inherent resiliency of the tire base sections may be utilized, if desired, to maintain the parts in firm engagement.

Another object of the invention is to provide a cushion tire structure which can be forced upon the fixed rim of a wheel structure without deformation or alteration in shape other than the obviously necessary stretching or expansion, it being well-known that the wheel structure is usually slightly larger in diameter than the inside diameter of the cushion tire structure. Throughout substantially its entire width and circumference the base is securely held by its frictional engagement with the fixed rim of the wheel structure.

Other objects will be apparent from the following description and annexed drawings.

Reference should be had to the accompanying drawings forming a part of this specification in which—

Figure 1 is a sectional view showing a tire moulded upon spaced side rings.

Fig. 2 is a perspective view of the center ring.

Fig. 3 is a front elevation showing diagrammatically an expanding machine with the tire, tire base sections, and locking ring in place thereon, preparatory to the expanding of the locking ring into locking engagement.

Fig. 4 is a sectional view showing diagrammatically a portion of the expanding machine with the tire base and locking ring thereon.

Fig. 5 is a sectional view of the finished article.

Fig. 6 is an enlarged view of the lower part of Fig. 4.

Referring to the annexed drawings, Fig. 5 shows the finished article in which the tire base is made up of a pair of annular side sections 1, preferably endless, and a ring 2, preferably endless. The side sections 1 are each provided with an outturned flange 3 on the outer edge, and peripheral rubber locking grooves 4 upon their outer faces. At their inner edges the sections 1 are rabbeted on the inside circumferentially and grooved, as at 5, along the shoulder of the rabbet to form circumferentially depending inner ribs 6 at their adjacent edges. The ring 2 is grooved circumferentially at 7 at its edges on the outside thereof, thus providing a rib 8 at each side. The ribs 8 of the ring 2 fit in the grooves 5 of the side sections, and the ribs 6 of the side section fit in the grooves 7 of the rings 2. The central portion 9 of the outside of the ring 2 fits between the edges of the section 1 and the inner periphery of the ring 2 is preferably substantially flush with and consequently of substantially the same circumferential dimension as the inner peripheries of the side sections.

The side sections with the intermediate endless ring form a circumferentially continuous imperforate tire base, which has ample strength to resist distortion in service or from lateral pressure while being forced onto the fixed rim of a wheel.

In forming the cushion tire structure, the body of the tire and the hard rubber layer, if desired, is built up in the usual manner, after a suitable core is inserted between the side sections 1 of the base to form the inner recess or air channel 10, when the tire body is cured or vulcanized. After the curing of the tire, an unobstructed space is provided between the side sections of the tire base, so that there is no difficulty in removing the core which can be made in two or three sections or whatever number of sections is most convenient.

After the tire is formed on the side sections of the base, and the core sections have been removed, the ring 2 is put in place, as hereinafter described, to complete the tire base and form a rigid structure. The ring 2 is preferably formed originally with an external surface having a diameter slightly less than the diameter of the internal surface of the base sections 1, so that it can be slipped freely inside the base and be expanded so that it is elongated peripherally to interlock with the side sections.

As shown in Figs. 3 and 4 for example, the ring 2 is inserted within the sections 1 with the ribs 5 and 6 interfitting at one side of the tire base, and placed upon the expanding segmental die 12 (diagrammatically shown) of an expanding machine which is designed to exert uniform outward radial pressure upon a ring placed thereon. The ring 2 is then expanded until it is forced into close fit throughout its entire circumference with the sections 1, the interfitting ribs 6 and 8 serving as guides to hold the rings in proper alinement during the expanding operation. The ring 2 and the side sections thus provide a construction in which the ring and side sections are not only rigidly connected throughout their peripheral edges but are actually in stressed condition, thus substantially resisting relative circumferential movement when mounted for use upon the fixed rim of a wheel body.

If it be desired to increase the relative stressing of the spacing or locking ring and the side sections more than by simply expanding or stretching the ring into engagement with the side sections and tensioning the latter, the ring 2 may be formed of a metal of a different elastic limit from that of the side sections 1.

For instance, the ring 2 may be formed, if desired, from a relatively lower carbon or softer steel or other metal softer than the metal from which the sections 1 are made so that it has consequently a relatively lower elastic limit. If the ring 2 is then stretched into the side sections and the stretching or expanding is carried on sufficiently to tension the side sections, they will, due to their relatively higher elastic limit, tend to contract relatively more than the ring 2 and consequently the sections 1 and the ring will be substantially stressed relative to each other. It will thus be seen that by the selection of materials the relative stress between the ring and the side sections can be varied but even if all of these members be formed from the same metal, it has been found that a very rigid substantially one piece construction will be produced in which the stressed relation is present.

Consequently upon assembling them and sizing them together a firm interlocking engagement between the side sections 1 and the ring 2 is obtained which will prevent relative circumferential as well as relative radial or lateral movement thereof.

The ribs 6 and 8 and the corresponding grooves 5 and 7 are shown for example as being relatively slightly tapered toward the plane of the wheel, but it is to be understood that they may be tapered through a wide range of angles, or they may be formed with curved surfaces or other interlocking means. The inward pressure will cause the ribs 6 and 8 to grip firmly in the grooves, forming a rigid connection substantially the equivalent of an integral structure when mounted on a wheel for service.

While the spacing ring 9 forms a connection with the side members substantially as rigid in use as though made permanent by welding, the ring can be removed to reclaim the side sections for use with new tires.

It will thus be seen that by our process a cushion tire structure may finally be sized to desired given dimensions to make up for any shrinkage, distortion or eccentricities that may arise from the curing operation, or from inaccurately sized side sections 1. Also, if it be desired, the sections 1 may be intentionally formed slightly under-sized, and after the endless ring 2 has been stretched into proper position relative to the side sections, the stretching may be continued until the sections 1 are expanded to the required size.

It is customary to apply a relatively high pressure to force a cushion tire structure laterally upon a fixed rim of a wheel structure, as the latter is usually made slightly larger in diameter than the inner diameter of the tire structure in order to insure a tight frictional engagement between the two. To facilitate the application of the tire base to the fixed rim the inner corners of the side sections and ring 2 may be rounded.

It will thus be seen that our base or cushion tire structure is made up of a plurality of parts, each of which will individually resist stretching whereby pressure is exerted upon the fixed rim of a wheel structure throughout substantially the entire area of the inner faces of such parts.

It will also be noticed that we have provided a sectional base in which the central spacing ring and the outer base sections may be made to have a sufficiently tight engagement to substantially prevent relative circumferential movement, the interlocking of the base members being such that relative lateral movement is prevented.

While we have described and shown our ring 2 as preferably endless and of one piece, it is to be understood that it may be made up of sections, or it may be a split ring with its ends held against movement relative to the side sections; or it may be of any other construction which will permit stretching or elongating to a larger diameter and will interlock with the side sections to form a rigid tire structure.

It will also be seen that with our process in which the ring is stretched cold, as described above, it is unnecessary to use heat for securing the parts together after the rubber tire has been vulcanized on the side sections. This latter is undesirable in that it tends to burn the rubber and to destroy the attachment of the rubber to the steel.

Furthermore, it is to be understood that the particular forms of apparatus shown and described, and the particular procedure set forth, are presented for the purposes of explanation and illustration, and that various modifications of said apparatus and procedure can be made without departing from our invention as defined in the appended claims.

Having thus described our invention, what we claim is:

1. The method of making a tire base or rim which comprises forming complementary locking means on endless annular side sections and an endless ring of smaller diameter, and stretching said ring into engagement with said side sections.

2. The method of making a tire base or rim which comprises forming complementary engaging means on annular side sections and an endless ring of smaller diameter than said side sections, and stretching said ring into engagement with said sections and tensioning said sections.

3. The process of producing a base for cushion tires which consists in placing a ring inside a pair of separated annular side sections and stretching said ring into engagement with said side sections to form a completely closed rigid base for said tire.

4. The method of producing a tire base which comprises forming complementary projections and recesses on the opposed faces of annular side sections and a spacing ring, and stretching said ring into engagement with said sections.

5. The method of making a tire base or rim which consists in forming continuous annular side sections and a ring of smaller circumferential dimension with complementary interlocking members upon said sections and ring, and expanding said ring into engagement with said sections, until the inner periphery of said ring is of substantially the same circumferential dimension as the inner periphery of said side sections.

6. The method of making a tire base or rim which consists in forming continuous annular side sections with circumferential ribs and grooves upon their inner faces, forming an endless ring with complementary ribs and grooves, placing the endless ring in position within said sections with its ribs and grooves in engagement with the grooves and ribs of said sections at one portion of said sections, and expanding said ring into full engagement with said sections, whereby the ribs and grooves act as guides to insure the ring properly engaging the side sections when fully expanded.

7. The method of forming a tire base or rim which consists in forming with complementary interlocking projections and recesses, continuous annular side sections of metal having a relatively higher elastic limit and a ring of metal having a relatively lower elastic limit, expanding said ring into locking engagement with said sections and then expanding said ring and sections simultaneously.

8. The method of forming a tire base or rim which consists in forming with complementary interlocking means, continuous annular side sections of metal having a relatively higher elastic limit and an endless ring of metal having a relatively lower elastic limit, and stretching said ring into locking engagement with said sections, and then expanding said ring and sections relatively slightly.

9. The method of forming a cushion tire structure which comprises curing a tire body upon annular base sections having a channel forming core between them, removing the core, and stretching a ring against the inner faces of said sections to rigidly secure the same together.

10. The method of forming a cushion tire structure which consists in curing a tire having an inner channel, upon spaced annular side sections and stretching a ring into engagement with said side sections.

11. The method of forming a cushion tire structure which consists in forming annular metallic tire base sections, and a spacing and interlocking ring of smaller diameter, forming complementary projections and recesses on said sections and ring, moulding and curing a tire body having an inner channel upon the spaced base sections, and elongating said ring into engagement with said sections.

In testimony whereof, we hereunto affix our signatures.

FRED R. KLAUS.
FRANK H. MEYER.